Inventor
Merle R. Swinehart
By
Attorney

United States Patent Office 3,548,290
Patented Dec. 15, 1970

3,548,290
PROPORTIONAL CONTROL SYSTEMS USING TWO CAPACITORS IN SERIES IN THE FIRING CIRCUIT WITH THE SMALLER ONE SHUNTED BY A CURRENT DRAIN DEVICE
Merle R. Swinehart, Brookfield, Wis., assignor to Cutler-Hammer, Inc., Milwaukee, Wis., a corporation of Delaware
Filed July 31, 1967, Ser. No. 657,137
Int. Cl. G05f 3/04
U.S. Cl. 323—19
8 Claims

ABSTRACT OF THE DISCLOSURE

A proportional control system of the condition responsive type which allows use of a variable current flow control condition responsive sensor in the low voltage side of a semiconductor control system. A thermistor senses an ambient condition such as temperature and controls leak off of current from the smaller one of a pair of series capacitors in the trigger control circuit of a solid state gating type power control element connected in the load circuit. Alternatively, the variable current flow control element may be a line voltage responsive lamp and photoresistor.

BACKGROUND OF THE INVENTION

This invention relates to the field of automatic proportional control of electrical load devices in response to some variable condition which is sensed. More specifically, the invention relates to proportional control of the energization of an alternating current or direct current load device as a function of a variable external condition wherein such condition is sensed by a variable resistor sensor such as a thermistor, photo cell, humidity cell or the like. For example, the proportional control may be applied to adjust the speed of a furnace blower in response to temperature change, to adjust the energization of an electric heater in response to temperature change, to adjust the energization of a lamp in response to change from daylight to darkness, to adjust a humidifier or dehumidifier in response to detection of change in the humidity level of the surrounding air, etc.

The state of the prior art in this field is such that proportional control for some applications has been known depending upon the magnitude of the input signal or variable condition that is available.

Cycling controls have also been known wherein an on-off switch is cycled at an adjustable rate to close and open the power supply circuit to a load such as a heater as a function of a varying condition such as a temperature or time. And, of course, continuously adjustable controls have been known wherein an operator senses or observes a varying condition and adjusts the power to a load device.

A manually controllable system wherein a bidirectional solid state gating type power control element or so-called "Quadrac" or "Triac" or a unidirectional solid state gating type power control element such as an "SCR" is used to adjust the electrical energy supplied to a load device is well known. In such system, a control device such as a trigger diode or so-called "Trigger" or "Diac" is connected in the gate circuit of the "Quadrac." An RC circuit is connected across the main terminals of the "Quadrac" with the junction between the manually adjustable resistor and capacitor thereof being connected through the "Diac" to the gate of the "Quadrac."

SUMMARY OF THE INVENTION

To obtain an automatic system for furnace blower speed control, for example, one would normally think of replacing the manually adjustable resistor in the above RC circuit with a negative temperature coefficient thermistor or adding a positive temperature coefficient thermistor across the capacitor in the RC circuit. However, the latter system is subject to instability at lower speeds arising from nonsymmetrical firing, resulting in a direct current component of motor current and dynamic braking on an intermittent basis which might be called hunting.

It has been discovered that if two capacitors are used in series in place of the single capacitor in the RC circuit of such system, a larger capacitor and a relatively smaller capacitor, the motor speed would be slow when the smaller capacitor is shorted out and would be fast when the resistance thereacross has a very large value. This provides a very stable control system which works very well. Accordingly, the invention resides in the use of two series capacitors and variable current flow control means such as adjustable resistance means across the smaller capacitor in such system as hereinafter more fully described.

An object of the invention is to provide an improved condition responsive proportional control system for an electrical load device.

A more specific object of the invention is to provide a semiconductor type proportional control system with improved means allowing use of a condition responsive variable current flow control device in the low voltage side of the semiconductor circuit.

Another specific object of the invention is to provide improved stability of operation in an electrical proportional control system of the condition responsive type.

Other objects and advantages of the invention will hereinafter appear.

BRIEF DESCRIPTION OF THE DRAWINGS

The above and other objects and advantages of the invention and the manner of obtaining them will best be understood by reference to the following description of preferred embodiments of proportional control systems taken in conjunction with the accompanying drawings, wherein.

DESCRIPTION OF THE PREFERRED EMBODIMENTS

Figure 1:
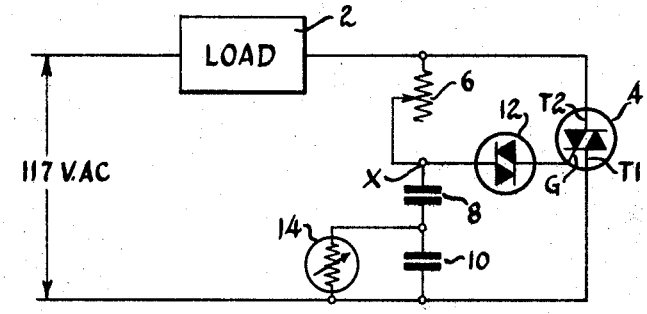
FIG. 1 is a schematic circuit diagram of a condition responsive proportional control system for an alternating current load device constructed with a bidirectional power control element in accordance with the invention.

Referring to FIG. 1, there is shown a condition responsive proportional control system which is manually adjustable for a desired load energization at a given external condition and from which it is controlled automatically as the condition varies. This system is connected in series with a load device 2 across an alternating current source such as the 117 volt source shown in FIG. 1.

This proportional control system is provided with means for controlling the magnitude of the alternating current applied to load device 2. This means comprises a controllable alternating current switching device such as a bidirectional semiconductor power control element 4 or the like called a "Quadrac." This power control element is provided with main AC terminals T1 and T2 and a control or gate terminal G. A current pulse of either polarity on the gate terminal will "fire" the "Quadrac"

into conduction on either polarity of voltage on the main terminals and current will then flow in the main terminals circuit for the remainder of the half-cycle of voltage or until the voltage on the main terminals decreases to a small value near zero. While a "Quadrac" is illustrated, other equivalent devices could be used in place thereof.

This proportional control system is also provided with means for controlling the firing of the bidirectional power control element in accordance with a manual presetting and a variable external condition. This means comprises a control circuit connected to the three terminals of the "Quadrac" and including resistance means such as a manually adjustable resistor 6 and capacitance means such as a relatively larger capacitor 8 and a relatively smaller capacitor 10 connected in series in that order from terminal T2 to terminal T1 of the "Quadrac." The junction between the resistor and the adjacent capacitor is connected through a triggering device such as a bidirectional trigger diode 12 to gate G of "Quadrac" 4, this diode being called a "Trigger" or "Diac." A condition responsive device 14 is connected across the relatively smaller capacitor 10 for leaking current off the latter as a function of time and as a function of a variable external or ambient condition to be sensed. This condition responsive device may be a variable current flow control means or variable resistor sensor such as a time controlled switching device, a thermistor, light cell such as a photo resistor, humidity cell or sensor or the like.

In the operation of the system of FIG. 1, it will be apparent that when an alternating current source is connected to the system an AC voltage will appear across terminals T1 and T2 of the "Quadrac." An AC voltage will also appear across the resistance-capacitance circuit to cause an alternating current to flow through the two capacitors. As a result, a phase-shifted alternating voltage called the capacitor voltage appears at junction X between resistor 6 and capacitor 8 and is applied to bidirectional trigger diode 12.

Assuming that 40 volts is required to trigger or cause breakover of diode 12, the "Quadrac" remains nonconducting until this valve of voltage is reached. If the tap on resistor 6 is moved up to decrease the resistance, more current will flow to cause the capacitor voltage to increase faster on each half-cycle. If the tap is moved down to increase the resistance, less current will flow to cause the capacitor voltage to increase slower on each half-cycle of the supply voltage. The faster the capacitor voltage increases, the sooner it will reach the breakover value of trigger diode 12 during each half-cycle and the greater will be the energization of the load device. Now, when the capacitor voltage reaches 40 volts as heretofore assumed, it triggers diode 12 to allow a current pulse to be applied therethrough to the gate of "Quadrac" 4. This fires the "Quadrac" into conduction, reducing its impedance substantially to zero and thereby allowing current flow from the source to the load device for the remainder of that half-cycle of the supply voltage.

This breakover of trigger diode 12 causes the capacitors to be partially discharged, dropping the capacitor voltage, whereupon the trigger diode regains its current blocking condition. The capacitor voltage then resumes its sine wave variation from this new value and charges in the other polarity next under the influence of the supply voltage until the trigger diode again triggers. The "Quadrac" conducts current for the remainder of the half-cycle during which it was fired as aforesaid and when the current reaches zero value at the end of the half-cycle, the "Quadrac" restores to its blocking condition. Thus, the "Quadrac" must be fired anew on each half-cycle of the supply voltage.

Condition responsive device 14 in FIG. 1 controls the point on each half-cycle at which the capacitor voltage reaches the triggering value of 40 volts in accordance with the previous assumption. This device 14 may be considered as a resistive device or the like or generally a current flow control device which leaks off current from the smaller capacitor 10 under manual, condition-responsive or other control conditions. It will be apparent that this variable leaking of current can be used to control the capacitor voltage or the rate of increase of the capacitor voltage during a half-cycle. Consequently, this condition responsive device will also control the point on the half-cycle at which the "Quadrac" is fired and will control the power to the load device.

In order to provide an explanation of a practical use of the system of FIG. 1, let it be assumed that the condition responsive device is a thermistor or, in other words, a variable resistor sensor having a negative temperature coefficient of resistance such that its resistance decreases as it heats and increases as it cools off. One application of such system would be in the control of the energization of a heater. Resistor 6 may be manually adjusted so that at a temperature of 68 degrees F. the heater will provide a given amount of heat. Thermistor 14 may then be arranged to sense the ambient temperature and to increase its resistance as the temperature drops. This increase in resistance means that less current will be leaked off the capacitor or the current will drain off at a slower rate causing the capacitor voltage to rise faster during each half-cycle to the triggering value. Consequently, power control element 4 will be fired earlier in each half-cycle to apply more energy to the heater tending to bring the temperature back up to where it should be. If the temperature increases above 68 degrees F., the thermistor will start leaking off more current to delay the triggering of the diode during each half-cycle thereby to reduce the power applied to the heater.

From the foregoing, it will be apparent that if a negative temperature coefficient condition responsive device is convenient for controlling a heater, then a positive temperature coefficient condition responsive device is convenient for controlling a cooling device such as a fan. Or either one could be used for either application if other means are used for reversing the control effect.

Figure 2:
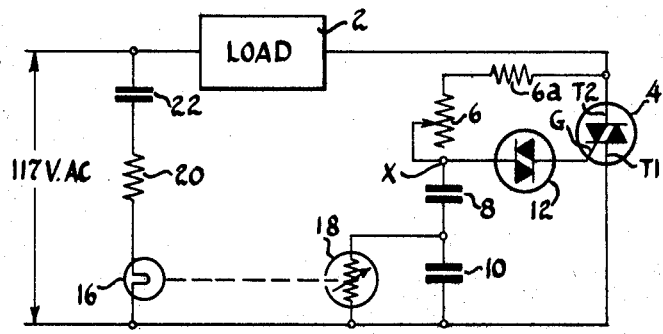
FIG. 2 is a schematic circuit diagram of a manual control system for alternating current lamp dimmer or motor control applications or the like and including compensation for line voltage variations.

Referring to FIG. 2, there is shown a manual control system for lamp dimmer or motor control applications or the like wherein condition responsive means is used for compensation for line voltage variations and the lamp brightness or motor speed is adjusted manually. Reference characters like those in FIG. 1 are used for like elements.

As in FIG. 1, this system is provided with a load 2 connected in series with a bidirectional semiconductor power control element 4 across an alternating current source. An adjustable resistor 6 and capacitors 8 and 10 are connected in series, with capacitor 10 being connected to a main terminal T1 of the power control element. A fixed resistor 6a may be connected between adjustable resistor 6 and main terminal T2 of the "Quadrac" to limit the adjustability of the resistance in the circuit to a minimum value. The junction X between adjustable resistor 6 and the larger capacitor 8 is connected through a bidirectional trigger diode 12 to gate terminal G of the "Quadrac" 4.

It will be apparent that the movable tap on resistor 6 can be manually adjusted to vary the brightness of the lamp or to vary the speed of the motor or as an initial presetting, depending on the type of load to which the system is applied. If the tap is moved up to decrease the resistance, the output power is increased and if the tap is moved down, the output power is decreased.

This system is also provided with means for compensating for line voltage variations. Thus, if the line voltage should increase tending to increase the output power to the load, the compensation means will react automatically thereto to retard the firing angle of the power control element thereby tending to maintain the output power constant and vice versa. This means comprises a line voltage responsive signalling device such as a low voltage lamp 16 and a signal responsive device such as a photoresistor 18. Lamp 16 is connected in series with a small resistor 20 and a capacitor 22 across the AC supply so that its brightness will be a function of or proportional to the line voltage. Photoresistor 18 is connected across smaller capacitor 10 so that it will variably leak current off this capacitor if the line voltage varies.

In this compensation circuit, a low voltage lamp 16 is preferred so that it will stand shock and vibration and the like in use. As an impedance means to reduce the line voltage for the lamp, a capacitor is preferred to a resistor because it does not consume as much wattage; however, a small resistor 20 is connected in series with capacitor 22 to protect the lamp from excessive current such as the transient current occurring momentarily when supply voltage is connected to the system. Since the current in a capacitive circuit is proportional to the rate of change of voltage and there may be a high rate of change of voltage if the supply switch is closed at other than voltage zero, resistor 20 limits this current to prevent burn-out of the lamp.

The system in FIG. 2 operates to maintain the energization of the load substanitally constant although the supply voltage might vary. Assuming that the load is a lamp, it will brighten if the line voltage increases in the absence of any compensation. Similarly, increase in line voltage would cause an increase in speed if the load is a motor unless compensation is used.

In the system of FIG. 2, an increase in line voltage will cause an increase in the brightness of compensation lamp 16. This increase brilliance of light impinges on photoresistor 18 to lower its resistance, assuming that it has a negative coefficient of resistance with respect to light. As a result, photoresistor 18 leaks off more current from capacitor 10. Consequently, it will take longer for the voltage at the junction X to reach the triggering value of diode 12 on each half-cycle of the supply voltage. This constitutes a retardation of the firing angle of power control element 4 thereby reducing the energization time of the load device 2 by an amount tending to maintain its energization constant in view of increased supply voltage magnitude.

A decrease in line voltage will cause a decrease in the brightness of compensation lamp 16. This decreased brilliance of the lamp increases the resistance of photoresistor 18, reduced the current drain from the capacitor. Consequently, the voltage at junction X will reach the triggering voltage value sooner on each half-cycle and power will be applied to the load over a longer time tending to maintain its energization constant.

Figure 3:
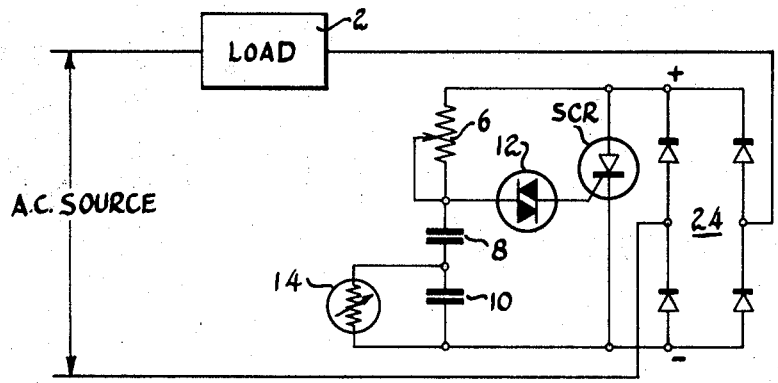
FIG. 3 is a modification of the circuit diagram of FIG. 1 having a rectifier bridge and a unidirectional power control element for controlling an A.C. load device.

Referring to FIG. 3, there is shown a modification wherein the "Quadrac" of FIG. 1 has been replaced by a unidirectional gating type power control element such as a semiconductor controlled rectifier (SCR) and a full-wave rectifier bridge. Otherwise this circuit is similar to that in FIG. 1 and like reference characters have been used for like elements.

As shown therein, load 2 is connected in series with the input terminals of rectifier bridge 24 across the A.C. source. The SCR is connected across the output terminals of the rectifier bridge with the anode thereof being connected to the positive output terminal and the cathode thereof being connected to the negative output terminal. Adjustable resistor 6 and capacitors 8 and 10 are connected in series in that order from the anode to the cathode of the SCR. The junction between the resistor 6 and capacitor 8 is connected by trigger diode 12 to the gate of the SCR. Condition responsive device 14 is connected across capacitor 10 as hereinbefore described.

This system in FIG. 3 operates in substantially the same manner as that in FIG. 1 to control energization of the alternating current load device 2 in response to a varying condition sensed by device 14. The full-wave alternating current is controlled by the signal SCR since the latter is supplied with half-cycles of undirectional current by the rectifier bridge. Thus, device 14 drains varying amounts of current from capacitor 10 to advance or retard the firing angle of the SCR. While the ultimate result is like that in FIG. 1, it will be noted that there is a functional difference in that capacitors 8 and 10 will always charge to the same polarity since the SCR and its firing control circuit are connected in the direct current side of the rectifier bridge.

Figure 4:
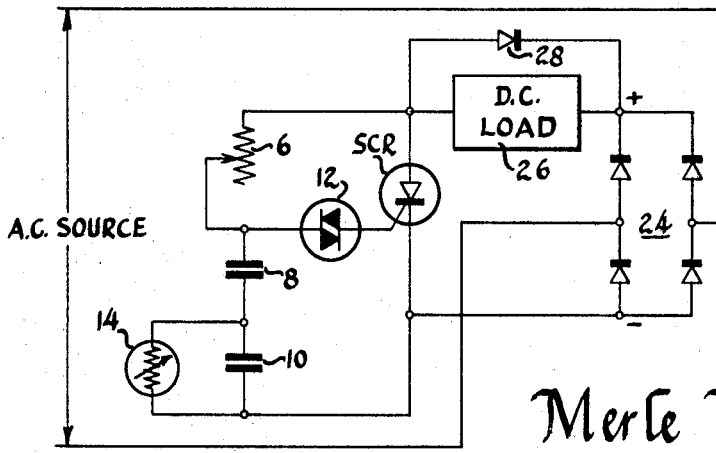
FIG. 4 is a circuit diagram like that in FIG. 3 applied to control a D.C. load device.

The system in FIG. 4 is similar to that in FIG. 3 except that it is applied to control energization of a direct current load 26. In this modification, the load is connected in series with the anode and cathode of the SCR in the direct current side of rectifier bridge 24. Otherwise, the circuit is similar to that shown in FIG. 3 and like reference characters have been used for like elements. If the load is inductive such as a relay coil or motor, a unidirectional diode 28 is connected across the load and poled in a direction opposite to normal energizing current flow. As will be apparent, diode 28 conducts current in response to the induced voltage in the inductive load.

I claim:

1. In a power control system having an electrical supply circuit for connecting power from an alternating current source to a load device, a power control circuit for controlling energization of the load device comprising:

a solid state gating type power control element and means connecting it in the supply circuit to the load device;

and a firing control circuit for said power control element comprising:

variable control means energized with alternating current from said power control circuit and comprising resistance means and capacitance means in circuit connection;

a trigger element connected from a junction of said resistance means and said capacitance means to the gate of said power control element to control firing of the latter when the voltage at said junction reaches the breakover voltage of said trigger element on predetermined half-cycles of the applied voltage;

said capacitance means including two capacitors in series connection to which said alternating current is applied through said resistance means to develop a trigger potential;

and variable current flow control means connected across one of said capacitors for controllably draining current therefrom to control the firing angle of said power control element by controlling the time point on the half-cycle of applied voltage at which said breakover voltage is reached.

2. The invention defined in claim 1, wherein said two capacitors include a first capacitor and a second relatively smaller capacitor;

and said variable current flow control means is connected across said smaller capacitor.

3. The invention defined in claim 2, wherein said solid state gating type power control element comprises:

a bidirectional element for switching alternating current.

4. The invention defined in claim 1, wherein said variable current flow control means comprises a variable resistor.

5. The invention defined in claim 1, wherein said variable current flow control means comprises:

a condition responsive device which senses a variable external condition and responds thereto to vary the current flow proportionally therethrough.

6. The invention defined in claim 1, together with:

means comprising a lamp supplied from said source to vary in brightness in proportion to any variation in supply voltage magnitude;

and said variable current flow control means comprises a photoresistor which responds to the variation in light from said lamp to retard said firing angle when the supply voltage increases, and vice versa, thereby to compensate for supply voltage variation.

7. In a power control system having an electrical supply circuit for connecting power from an alternating current source to a load device, a power control circuit for controlling energization of the load device comprising:

a solid state gating type power control element and means connecting it in the supply circuit to the load device;

and a firing control circuit for said power control element comprising:

variable control means energized with only half-cycles of current from said power control circuit and comprising resistance means and capacitance means in circuit connection;

a trigger element connected from a junction of said resistance means and said capacitance means to the gate of said power control element to control firing of the latter when the voltage at said junction reaches the breakover voltage of said trigger element on predetermined half-cycles of the applied voltage;

said capacitor means including two capacitors in series connection to which a half-cycle of current is applied through said resistance means to develop a trigger potential;

and variable current flow control means connected across one of said capacitors for controllably draining current therefrom to control the firing angle of said power control element by controlling the time point on the half-cycle of applied voltage at which said breakover voltage is reached.

8. The invention defined in claim 7, wherein said solid state gating type power control element and means connecting it in the supply circuit to the load device comprises:

a semiconductor controlled rectifier and full-wave rectifier bridge, the latter being connected in the supply circuit and said controlled rectifier being connected in the rectified current side of said bridge.

References Cited

UNITED STATES PATENTS

| | | |
|---|---|---|
| 3,385,077 | 5/1968 | Marsteller. |
| 3,410,105 | 11/1968 | Marsteller _____ 62—180 |
| 3,242,346 | 3/1966 | Skoubo _____ 323—22X(SCR) |
| 3,244,964 | 4/1966 | Greening et al. __ 323—22(SCR) |
| 3,344,311 | 9/1967 | Nuckolls _____ 323—22X(SCR) |
| 3,368,140 | 2/1968 | Tobey _____ 323—22(SCR) |

OTHER REFERENCES

G.E. Silicon Controlled Rectifier Manual, "Trigger Circuits for Phase Control," 1964, pp. 130, 131.

WILLIAM M. SHOOP, JR., Primary Examiner

A. D. PELLINEN, Assistant Examiner

U.S. Cl. X.R.

321—18; 323—21, 24, 36